United States Patent [19]

Catsman

[11] Patent Number: 6,166,133
[45] Date of Patent: Dec. 26, 2000

[54] PC/ABS BLENDS POSSESSING HIGH MELT FLOW HAVING CONTROLLED LEVELS OF FRIES BRANCHING SPECIES

[75] Inventor: Peter Catsman, Bergen op Zoom, Netherlands

[73] Assignee: General Electric Company, Schenectady, N.Y.

[21] Appl. No.: 09/249,467

[22] Filed: Feb. 12, 1999

[51] Int. Cl.[7] ..................................................... C08L 69/00
[52] U.S. Cl. ........................... 525/67; 525/92 E; 525/462
[58] Field of Search .............................. 525/67, 146, 148, 525/92 E, 462

[56] References Cited

U.S. PATENT DOCUMENTS

| | | |
|---|---|---|
| 4,371,660 | 2/1983 | Calundann et al. |
| 5,055,523 | 10/1991 | Inoue . |
| 5,187,242 | 2/1993 | Sakashita et al. |
| 5,319,066 | 6/1994 | King, Jr. |
| 5,578,694 | 11/1996 | Yokoyama . |
| 5,652,313 | 7/1997 | Kühling et al. |
| 5,767,224 | 6/1998 | Kuhling . |

FOREIGN PATENT DOCUMENTS

| | | |
|---|---|---|
| 0 140 341 | 5/1985 | European Pat. Off. |
| 0 535 261 | 4/1993 | European Pat. Off. |
| 239331 | 9/1993 | Japan . |
| 06009768 A2 | 1/1994 | Japan . |

OTHER PUBLICATIONS

Patent Abstract of Japan of J09059371.

Applications 8CJ–12606PA, 8CJ–12607PA, 8CJ–12608PA & 8CJ–12609PA entitled, Method of Manufacturing Polycarbonates.

Official Gazette for Unexamined Patent Applications—Application (Kokai) No. 7–53704, Disclosure Date Feb. 28, 1995.

*Primary Examiner*—David J. Buttner
*Attorney, Agent, or Firm*—Kenneth S. Wheelock

[57] ABSTRACT

Polymer alloys comprising polycarbonate having a Fries branching controlled between 300 to 5,000 ppm and also comprising a rubber exhibit superior molding and flow properties.

3 Claims, No Drawings

PC/ABS BLENDS POSSESSING HIGH MELT FLOW HAVING CONTROLLED LEVELS OF FRIES BRANCHING SPECIES

FIELD OF THE INVENTION

This invention relates to a composition comprising polycarbonate, wherein the polycarbonate has a controlled content of a particular branching species. This branching species is depicted below in formula (I), and is commonly known as the "Fries" branching species (hereinafter "Fries"). More particularly, this invention relates to polycarbonate polymer blends comprising low Fries polycarbonate made by the melt synthesis method.

BACKGROUND OF THE INVENTION

Conventional industrial plants synthesize polycarbonate by mixing together an aqueous solution of a dihydroxy compound (e.g., bisphenol-A) with an organic solvent (e.g., dicloromethane) containing a carbonyl halide (e.g., phosgene). Upon mixing the immiscible organic and aqueous phases, the dihydroxy compound reacts with the carbonyl halide at the phase interface. Typically, a phase transfer catalyst, such as a tertiary amine, is added to the aqueous phase to enhance this reaction. This synthesis method is commonly known as the "interfacial" synthesis method for preparing polycarbonate.

The interfacial method for making polycarbonate has several inherent disadvantages. First, it is a disadvantage to operate a process which requires phosgene as a reactant due to obvious safety concerns. Second, it is a disadvantage to operate a process which requires using large amounts of an organic solvent because expensive precautions must be taken to guard against any adverse environmental impact. Third, the interfacial method requires a relatively large amount of equipment and capital investment. Fourth, the polycarbonate produced by the material process is prone to having inconsistent color, higher levels of particulates, and higher chlorine content, which can cause corrosion.

A new method of manufacturing has been developed which avoids several of the problems associated with the interfacial method. Specifically, some newer commercial polycarbonate plants synthesize polycarbonate by a trans-esterification reaction where a carbonate diester (e.g., diphenylcarbonate) is condensed with a dihydroxy compound (e.g., bisphenol-A). This reaction is performed without a solvent, and is driven to completion by mixing the reactants under reduced pressure and high temperature with simultaneous distillation of the phenol produced by the reaction. This synthesis technique is commonly referred to as the "melt" technique. The melt technique is safer than the interfacial technique because it does not employ phosgene, it does not require a solvent, and it uses less equipment. Moreover, the polycarbonate produced by the melt process does not contain chlorine contamination from the reactants, has lower particulate levels, and has a more consistent color. Therefore, it is usually more desirable to use the melt technique in a commercial manufacturing process.

The melt technique produces polycarbonate which differs from polycarbonate produced by the interfacial method. Specifically, the conventional interfacial method tends to produce polycarbonate which has close to zero branching. Not only is it desirable to have a controlled level of branching for some applications, such as those which require a very high ductility, but also a high level of branching is desireable for other applications which require high melt strength. If any branching is desired in polycarbonate produced by the interfacial process, it must be introduced by adding a branching agent during polymerization because the Fries branching species is not typically present in appreciable amounts in polycarbonate produced by the interfacial method. In contrast, the melt technique tends to produce polycarbonate having a high level of Fries branching species. Accordingly, it would be desirable to produce controlled Fries polycarbonate by the melt technique for certain applications because higher levels of Fries are associated with low ductility. As noted below, Applicants have solved this problem.

Japanese Published Patent Application Number 9-59371 to Teijin (hereinafter the "Teijin Publication") discloses a method for manufacturing polycarbonate by the melt process wherein the polycarbonate contains from 0.001 to 0.3 mole percent of Fries plus a second branching species, but contains at least 0.001 mole percent of the second branching species. Therefore, the Teijin Publication specifies melt polycarbonate having a level of Fries below 0.299 mole percent. However, the Teijin Publication does not teach how to make polycarbonate by the melt process which has a very low level of Fries. In fact, the Teijin publication only discloses a polycarbonate made by the melt process having a level of Fries above about 360 ppm (working example 3) and does not mention catalysts which are effective in significantly reducing Fries content. Moreover, the Teijin Publication does not disclose the advantages of using melt polycarbonate having a very low level of Fries in specific applications.

A general need clearly exists for a polycarbonate made by the melt process which has a controlled level of Fries. A need also exists for a method for making low Fries polycarbonate via the melt process.

SUMMARY OF THE INVENTION

I have discovered that blends of polycarbonate polymers with rubber possess excellent melt processing characteristics when the Fries content of the polycarbonate component of the polymer blend is above 25 ppm. I have further discovered that this remains true when the polymer blend also contains a fire retardant compound, particularly a phosphate based fire retardant compound.

DETAILED DESCRIPTION OF THE INVENTION

The compositions of the present invention are polymer alloys (or mixtures that may or may not be miscible) of polycarbonate polymers and rubber polymers. The alloys of the present invention comprise polycarbonate or polycarbonate mixtures having a controlled Fries branching that results in improved processability as measured by various melt flow indices and rubber. The rubbers utilized to form the polymer alloys of the present invention may be any of several synthetic or naturally occurring rubbers but are generally rubbers known in the art as ABS interpolymers (an all-inclusive term meaning copolymers and higher order copolymers such as terpolymers and the like and including graft copolymers, block copolymers and graft block copolymers), where the A stands for a co-polymerized acrylate functionality, the B stands for a co-polymerized butadiene and the S stands for a co-polymerized styrenic functionality.

The weight proportions of the two major components of the alloys or mixtures of the present invention are a weight fraction of polycarbonate or mixtures thereof ranging from about 30 weight percent to about 99 weight percent, preferably from about 35 weight percent to about 99 weight percent, more preferably from about 40 weight percent to about 95 weight percent and most preferably from about 45 weight percent to about 90 weight percent and a weight fraction of rubber ranging from about 70 weight percent to about 1 weight percent, preferably from about 65 weight percent to about 1 weight percent, more preferably from about 60 weight percent to about 5 weight percent and most preferably from about 55 weight percent to about 10 weight percent.

As used herein, the term "Fries" or "fries" refers to a repeating unit in polycarbonate having the following formula:

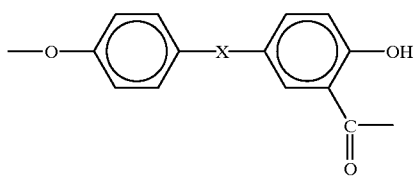
(I)

wherein X is a bivalent radical as described in formula (II). The hydroxyl group in formula I is where the additional branched chain grows. The content of this repeating unit in the polycarbonate can be determined by the procedure described below in Example 1.

As used herein, the term "melt polycarbonate" refers to polycarbonate made by transesterification of a carbonate diester with a dihydroxy compound.

As used herein, the term "interfacial polycarbonate" refers to polycarbonate made by mixing a solution of a dihydroxy compound together with an organic phase comprising a carbonyl halide that is immiscible with the dihydroxy solution.

The present invention provides a polymer alloy composition comprising melt polycarbonate, wherein the melt polycarbonate has a controlled Fries content. Specifically, the Fries content of the polycarbonate ranges from 300 to 5,000 ppm, preferably from 400 to 4,000 ppm, more preferably from 500 to 3,000 ppm and most preferably from 1,000 to 3,000. It should be noted that interfacial polycarbonate typically has a Fries content of less than 5 ppm, and nearly always has a Fries content below 25 ppm The present invention further provides a composition comprising polycarbonate wherein the polycarbonate has a controlled level of Fries. This polycarbonate may be melt polycarbonate or a mixture of melt and interfacial polycarbonate. Specifically, the Fries content of the polycarbonate ranges from 300 to 5,000 ppm, preferably from 400 to 4,000 ppm, more preferably from 500 to 3,000 ppm and most preferably from 1,000 to 3,000. Thus melt process produced polycarbonate having a Fries branching greater than 5,000 ppm can be blended with low Fries content polycarbonate, however produced, to produce a polycarbonate suitable for blending into the polymer blends or alloys of the present invention.

In another aspect, the present invention also provides a composition comprising polycarbonate wherein the polycarbonate has an MVR of about 3 to about 50. All of the MVR values for polycarbonate or blends of polycarbonate given in this application were measured at 1.2 kg and 300° C., while MVR values for polymer alloys containing polycarbonate and other polymers such as ABS were measured at 5 kg and 260° C.; and at 2.16 kg and 260° C. for alloys containing phosphate derived flame retardant compounds. In a preferred embodiment of the invention, the MVR of the polycarbonate ABS alloy is between about 3 and about 40. In a more preferred embodiment, the MVR of the polycarbonate ABS alloy ranges from about 10 to about 50. In a most preferred embodiment of the invention, the MVR of the polycarbonate ABS alloy ranges from about 15 to about 40.

The composition comprising polycarbonate may further comprise many different additional polymers There are at least two different methods of making a composition comprising polycarbonate wherein the composition has a Fries content above that typically encountered for interfacial polycarbonate, but below 5,000 ppm. The simplest method merely involves blending an appropriate amount of melt polycarbonate into interfacial polycarbonate. This can be accomplished by a variety of methods, such as simply adding appropriate proportions of high Fries melt polycarbonate and interfacial polycarbonate into an extruder. Alternatively, one can prepare low Fries melt polycarbonate and can add any other desirable ingredients which do not contain unacceptable proportions of Fries. Methods for preparing melt polycarbonate having a level of fries below 5,000 ppm are described generally below.

As stated above, the melt process for preparing polycarbonate comprises reacting a dihydroxy compound with a carbonate diester.

There is no particular restriction on the type of dihydroxy compound that can be used in this invention. For example, bisphenol compounds represented by the general formula (II) below can be used.

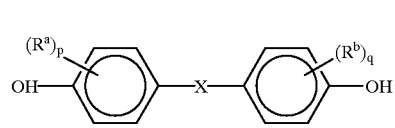
(II)

In formula (II), Ra and Rb each represent a halogen atom or a monovalent hydrocarbon group and may be the same or different. The p and q variables represent integers from 0 to 4.

The X variable represents or

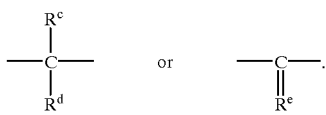

Variables $R^c$ and $R^d$ each independently represent a hydrogen atom or a monovalent hydrocarbon group. Variables $R^c$ and $R^d$ may form a ring structure. Variable $R^e$ is a divalent hydrocarbon group.

Specific examples of the types of bisphenol compounds that may be represented by formula (II) include the following:

1,1-bis(4-hydroxyphenyl) methane;
1,1-bis(4-hydroxyphenyl) ethane;
2,2-bis(4-hydroxyphenyl) propane (hereinafter referred to as "bisphenol A");
2,2-bis(4-hydroxyphenyl) butane;
2,2-bis(4-hydroxyphenyl) octane;
1,1-bis(4-hydroxyphenyl) propane;
1,1 -bis(4-hydroxyphenyl) n-butane;
bis(4-hydroxyphenyl) phenylmethane;
2,2-bis(4-hydroxy-1-methylphenyl) propane;
1,1-bis(4-hydroxy-t-butylphenyl) propane;
bis(hydroxyaryl) alkanes such as 2,2-bis(4-hydroxy-3-bromophenyl) propane;

1,1-bis(4-hydroxyphenyl) cyclopentane;
or bis(hydroxyaryl) cycloalkanes such as 1,1-bis(4-hydroxyphenyl) cyclohexane.

In the present invention, the X in the bisphenol shown in the above formula may represent an —O—, —S—, —SO—, or —SO$_2$— group, for example:
4,4'-dihyrdoxydiphenyl ether;
a bis(hydroxyaryl) ether such as 4,4'-dihyrdoxy-3,3'-dimethylphenyl ether;
4,4'-dihyrdoxydiphenyl sulfide;
a bis(hydroxyaryl) sulfide such as 4,4'-dihyrdoxy-3,3'-dimethyldiphenyl sulfide;
4,4'-dihyrdoxydiphenyl sulfoxide;
a bis(hydroxyaryl) sulfoxide such as 4,4'-dihyrdoxy-3,3'-dimethyldiphenyl sulfoxide;
4,4'-dihyrdoxydiphenyl sulfone;
or a bis(hydroxyaryl) sulfone such as 4,4'-dihyrdoxy-3,3'-dimethyldiphenyl sulfone.

In addition, the bisphenol used may be a compound represented by formula (III) below.

(III)

In the formula (III), $R^f$ may represent a halogen atom, a hydrocarbon group containing 1 to 10 carbon atoms, or a halogen substituted hydrocarbon group. The variable n represents an integer from 0 to 4. If n is 2 or greater, the groups represented by $R^f$ may be the same or different.

The bisphenol represented by formula (III) may be, for example: resorcinol; a substituted resorcinol compound such as 3-methylresorcinol, 3-ethylresorcinol, 3-propylresorcinol, 3-butylresorcinol, 3-t-butylresorcinol, 3-phenyl-resorcinol, 3-cumylresorcinol, 2,3,4,6-tetrafluororesorcinol, and 2,3,4,6-tetrabromo-resorcinol; catechol; hydroquinone; or a substituted hydroquinone compound such as 3-methylhydroquinone, 3-ethylhydroquinone, 3-propylhydroquinone, 3-butylhydroquinone, 3-t-butylhydroquinone, 3-phenylhydroquinone, 3-cumylhydroq-uinone, 2,3,5,6-tetramnethylhydroquinone, 2,3,5,6-tetra-t-butylhydroquinone, 2,3,5,6-tetrafluorohydroquinone, and 2,3,5,6-tetrabromohydroquinone.

Alternatively, the bisphenol represented by formula (III) may be a compound according to formula (IV) below:

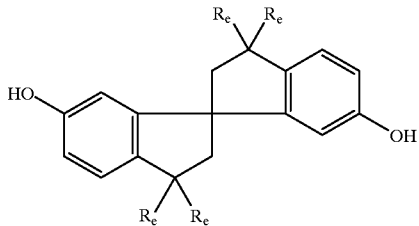

(IV)

wherein $R_e$ represents a $C_{1-3}$ alkyl or a phenyl group. A preferred compound according to formula (IV) is 2,2,2',2'-tetrahydro-3,3,3',3'-tetramethyl-1,1'-spirobi-[1H-indane]-6,6'-diol.

Of the above compounds, the bisphenols represented by formula (II) are preferable. The most preferred compound is bisphenol A.

It is also possible to combine, two, three, or more of the above dihydroxy compounds by copolymerization to manufacture copolycarbonates.

The carbonate diester compound used in this invention may be:
diphenyl carbonate, bis(4-t-butylphenyl) carbonate, bis(2,4-dichlorophenyl) carbonate, bis(2,4,6-trichlorophenyl) carbonate, bis(2-cyanophenyl) carbonate, bis(o-nitrophenyl) carbonate, ditolyl carbonate, m-cresol carbonate, dinapthyl carbonate, bis(diphenyl) carbonate, diethyl carbonate, dimethyl carbonate, dibutyl carbonate, or dicylcohexyl carbonate. Of these, diphenyl carbonate is preferred. If two or more of these compounds is combined, it is preferable to use diphenyl carbonate as one component of the combination.

The carbonate diesters used in this invention may also contain dicarboxylic acids or dicarboxylic acid esters. Specifically, for the carbonate diester, dicarboxylic acids or the dicarboxylic acid esters should preferably be present at no greater than 50 mole percent, and more preferably at no greater than 30 mole percent.

These dicarboxylic acids or dicarboxylic acid esters may include terephthalic acid, isophthalic acid, sebacic acid, decanedioic acid, dodecanedioic acid, diphenyl sebacate, diphenyl terephthalate, diphenyl isophthalate, diphenyl decanedioate, or diphenyl dodecanedioate. The carbonate diesters may also contain a combination of 2 or more dicarboxylic acids and/or dicarboxylic acid esters.

Polyester polycarbonates can be also be manufactured by polycondensation of a diester carbonate containing the above types of dicarboxylic acids and/or dicarboxylic acid esters with the previously mentioned aromatic dihydroxy compounds.

During the manufacture of low Fries polycarbonates, the amount of the above types of carbonate diesters should be kept at a ratio of 0.95 to 1.30 moles, and more preferably at a ratio of 1.01 to 1.20 moles, per 1 mole used of the aromatic dihydroxy compound.

Polyfunctional compounds having three or more functional groups per molecule may be added to the above-mentioned aromatic dihydroxy compounds and carbonate diesters in order to manufacture polycarbonates by copolymerization. However, it is generally not advisable to use such polyfunctional compounds when attempting to manufacture very low Fries polycarbonate.

The total amount of alkali metal compounds and alkaline earth metal compounds present as impurities in the above dihydroxy compounds and carbonate diesters should be no greater than $1\times10^{-6}$ mole, and preferably no greater than $5\times10^{-7}$ mole, per 1 mole of the dihydroxy compound.

A total amount of alkali metal compounds and/or alkaline earth metal compounds present as impurities within the above dihydroxy compounds and carbonate diesters of greater than $1\times10^{-7}$ mole per 1 mole of the dihydroxy compound may inhibit the effectiveness of the catalyst.

These types of high purity dihydroxy compounds and carbonate diesters can be obtained by purifying impure dihydroxy compound and carbonate diesters. Distillation, recrystallization, and other well known methods are suitable for this purpose.

Polycarbonates are preferably manufactured in a closed system wherein the apparatus for manufacturing the raw materials and the apparatus for manufacturing the polycarbonates are directly connected. Manufacturing polycarbonates in this type of closed system can help to eliminate mixing in of impurities.

During the manufacture of polycarbonates described in this invention, a termination agent may also be used with the above-mentioned aromatic dihydroxy compounds and carbonate diesters.

The termination agent is preferably an aryloxy compound, represented by the general formula (V) below, and can be introduced as a terminal group to the end of the manufactured polycarbonate molecules.

ArO—                        (V)

In formula (V), Ar represents an aromatic hydrocarbon group containing 6 to 50 carbon atoms. There is no specific restriction on the type of aromatic hydrocarbon group. A condensed ring structure such as a phenyl group, naphthyl group, or anthranyl group may be used. Moreover, the aromatic ring with saturated carbon atom(s) and/or different atoms may form cyclic structures. In addition, these aromatic rings may be substituted with a halogen or alkyl group containing 1 to 9 carbon atoms.

These type of aryloxy compounds may include: phenol, diphenyl carbonate, p-tert-butylphenol, p-tert-butylphenylphenyl carbonate, p-tert-butylphenyl carbonate, p-cumylphenol, p-cumylphenylphenyl carbonate, p-cumylphenyl carbonate; and chroman compounds such as 2,2,4-trimethyl-4-(4-hydroxyphenyl) chroman, 2,2,4,6-tetramethyl-4-(3,5-dimethyl-4-hydroxyphenyl) chroman, 2,2,3-trimethyl-3-(4-hydroxyphenyl) chroman, 2,2,3,6-tetramethyl-3-(3,5-dimethyl-4-hydroxyphenyl) chroman, 2,4,4-trimethyl-2-(2-hydroxyphenyl) chroman, and 2,4,4,6-tetramethyl-2-(3,5-dimethyl-2-hydroxyphenyl) chroman.

One or a combination of the above types of aryloxy compounds may be used in this invention.

These aryloxy compounds should be present in amounts of 0.01 to 0.2 mole, preferably at 0.02 to 0.15 mole, and more preferably at 0.02 to 0.1 mole per 1 mole of the aromatic dihydroxy compound.

The melt polycarbonate preferably has an end-capping content of at least 85%, and more preferably at least 96%. Additional end-capping techniques and agents are described in U.S. Pat. No. 5,187,242, which is hereby incorporated by reference.

Other terminating agents may also be used, such as aliphatic monocarboxy compounds according to formula (VI).

$$R-\underset{\underset{O}{\|}}{C}-O-$$                  (VI)

In formula (VI), R represents an alkyl group containing 10 to 30 carbon atoms. The alkyl group may be linear or branched. The alkyl group may also be substituted by a halogen.

Specific examples of such aliphatic monocarboxy compounds include; alkyl monocarboxylic acids such as undecanoic acid, lauric acid, tridecanoic acid, pentadecanoic acid, palmitic acid, heptadecanoic acid, stearic acid, nonadecanoic acid, heneicosanoic acid, tricosanoic acid, and mellisic acid; and alkyl inonocarboxylic acid esters, including alkyl monocarboxylic acid methyl esters, ethyl esters, and phenyl esters such as methyl stearate, ethyl stearate, and phenyl stearate.

One, or a combination of the above terminating agents may be used in this invention. These types of aliphatic monocarboxy compounds should be present in amounts of 0.01 to 0.20 mole, preferably at 0.02 to 0.15 mole, and more preferably at 0.02 to 0.10 mole per 1 mole of the aromatic dihydroxy compound. Use of the above types of termination agents in total amounts greater than 0.2 mole per 1 mole of the aromatic dihydroxy compound may reduce the rate of polymerization.

Several types of catalysts are suitable for making polycarbonate having a Fries level below 5,000 ppm. Experimental investigations have shown that lithium salts provide the lowest level of Fries when comparing the ascending weight series of alkali metals: lithium, sodium and potassium. However, cesium catalyst are superior to potassium in producing low Fries polycarbonate. Experiments showed that the following anions produced more Fries in accordance with the following relationship: halide>ArCOO>$H_2PO4$>$HPO_4^{-2}$<OH—. This order suggests that Fries formulation may be predicted from the relative basicity of the added catalyst.

It was further found that amines, ammonium and phosphonion salts produced even less Fries than lithium salts. Therefore, these catalysts are preferred. More preferred catalyst include cesium salts, amines, tetra-alky ammonium salts, tetra-alkyl phosphonium salts, and guanidines. Among these, the most preferred catalysts are guanidines, alkali metal phosphites and alkali earth metal phosphites. Many suitable types of guanidine catalysts are described for example in U.S. Pat. No. 5,319,066, which is hereby incorporated by reference. Many suitable types of alkali metal phosphite catalysts and alkali earth metal phosphite catalysts are described in U.S. Provisional Patent Application Ser. Nos. 60/109,496, 60/109,495, 60/109,472 and 60/109,473, all filed on Nov. 23, 1998, which are hereby incorporated by reference.

In the present invention, polycarbonates are manufactured by melt polycondensation of the previously mentioned dihydroxy compounds and carbonate diesters in the presence of the above described catalysts. Specifically, the dihydroxy compound and the carbonate diester are preferably reacted at atmospheric pressure during the first stage reaction at a temperature of 80 to 250° C., preferably at 100 to 230° C., and more preferably at 120 to 190° C., and in general for 0 to 5 hours, preferably for 0 to 4 hours, and even more preferably for 0 to 3 hours. Next, the dihydroxy compound and the carbonate diester should be reacted as the pressure of the system is lowered and the temperature is raised. Finally, the polycondensation reaction of the dihydroxy compound with the carbonate diester should be carried out at 240 to 320° C. at less than 5 mm Hg, and preferably at less than 1 mm Hg.

The above polycondensation reaction may be carried out by a continuous or batch method. The apparatus used for carrying out the above reaction may be a vessel, tube, or tower-like structure.

The intrinsic viscosity of the polycarbonate products measured in methylene chloride at 20° C. should be 0.10 to 1.0 dl/g, and preferably 0.30 to 0.65 dl/g.

The above manufacturing method can provide a polycarbonate with excellent color stability.

For quantitative determination of Fries catalyst, an alkali such as sodium hydroxide can be added to the manufactured polycarbonates in order to hydrolyze and generate the branched compounds represented by the general formulas (VII) and (VIII) shown below.

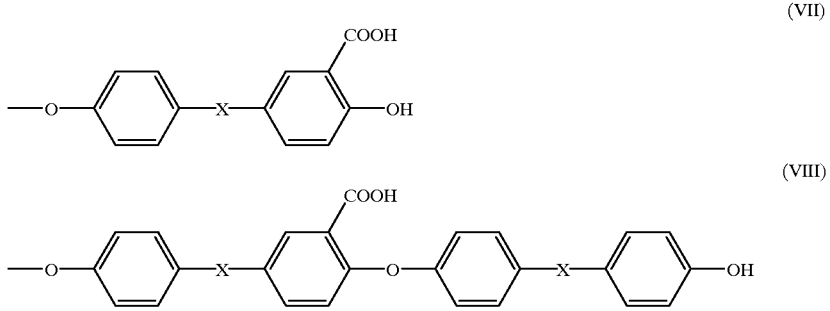

The quantities of these compounds can then be assayed by high-performance liquid chromatography (HPLC). This procedure is also described in Example 1, below.

The polycarbonate reaction product obtained as described above does not have to be cooled. Instead, immediately after the polycondensation reaction, a derivative formed from a sulfur containing acidic compound and/or the acidic compound with a pKa of no greater than 3 (hereinafter also referred to as the acidic compound), may be added. This derivative formed may be sulfurous acid, sulfuric acid, a sulfinic acid compound, a sulfonic acid compound, or any related derivative. Specific examples include ethyl benzenesulfonate, butyl benzenesulfonate, methyl p-toluenesulfonate, ethyl p-toluenesulfonate, and butyl p-toluenesulfonate.

The amount of the derivative present should be 0.1 to 50 moles, preferably 0.1 to 15 moles, and more preferably 0.1 to 7 moles times the amount of alkali metal phosphite used in the above polycarbonate reaction. The addition of these amounts of the acidic compound to the reaction product (polycarbonate) will neutralize or dilute any remaining alkali metal phosphite in the polycarbonate, ultimately providing a polycarbonate with improved stability and moisture resistance.

Furthermore, water may also be added with the above acidic compounds. The amount of water added to the polycarbonate should be from 5 to 1000 ppm, preferably 10 to 500 ppm, and more preferably 20 to 300 ppm. Addition of the acidic compound and water will further increase the efficiency of neutralization of the polycondensation catalyst in the polycarbonate, and can result in the production of a polycarbonate with good stability during melting together with excellent initial color, transparency, moisture resistance, and weather resistance.

Mixing of the polycarbonate may be carried out using a single screw extruder, twin screw extruder, or other conventional kneader such as a static mixer. A kneader with or without bends can be effectively used.

Furthermore, the acidic compound and water may be added while the polycarbonate obtained by the polycondensation reaction is in a molten state within the reactor or extruder. The acidic compound and water may be added separately or together. Although the order of addition is not limited, they should preferably be added at the same time.

Additives may also be added to the polycarbonate product as long as they do not adversely effect the basic objectives of this invention. These additives include a wide range of substances that are conventionally added to polycarbonates for a variety of purposes. Specific examples include heat stabilizers, epoxy compounds, ultraviolet absorbers, mold release agents, colorants, antistatic agents, slipping agents, anti-blocking agents, lubricants, anti-fogging agents, natural oils, synthetic oils, waxes, organic fillers, flame retardants, inorganic fillers, and any other commonly known class of additives.

Rubber modified thermoplastic resins suitable for use as the rubber modified thermoplastic resin of the present invention are those rubber modified thermoplastic resins that are made by a bulk or, synonymously, mass, polymerization process and that comprise a discontinuous rubber phase dispersed in a continuous rigid thermoplastic phase, wherein at least a portion of the rigid thermoplastic phase is chemically grafted to the rubber phase.

Suitable rubbers for use in making the rubber phase are polymers those having a glass transition temperature (Tg) of less than or equal to 25° C., more preferably less than or equal to 0° C., and even more preferably less than or equal to −30° C. As referred to herein, the Tg of a polymer is the Tg value of polymer as measured by differential scanning calorimetry (heating rate 200 C/minute, with the $T_g$ value being determined at the inflection point).

In a preferred embodiment, the rubber comprises a linear polymer having structural units derived from one or more conjugated diene monomers.

Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2, 4, hexadiene, dichlorobutadiene, bromobutadiene and dibromobutadiene as well as mixtures of conjugated diene monomers. In a preferred embodiment, the conjugated diene monomer is 1,3-butadiene.

The rubber may, optionally, include structural units derived from one or more copolymerizable monoethylenically unsaturated monomers selected from ($C_2$–$C_8$)olefin monomers, vinyl aromatic monomers and monoethylenically unsaturated nitrile monomers and ($C_1$–$C_{12}$) alkyl (meth)acrylate monomers.

As used herein, the term "($C_2$–$C_8$) olefin monomers" means a compound having from 2 to 8 carbon atoms per molecule and having a single site of ethylenic unsaturation per molecule. Suitable ($C_2$–$C_8$)olefin monomers include, e.g., ethylene, propene, 1-butene, 1-pentene, heptene.

Suitable vinyl aromatic monomers include, e.g., styrene and substituted styrenes having one or more alkyl, alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile.

As used herein, the term "($C_1$–$C_{12}$) alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers. Suitable ($C_1$–$C_{12}$) alkyl (meth)acrylate monomers include ($C_1$–$C_{12}$) alkyl acrylate monomers, e.g., ethyl acrylate, butyl acrylate, iso-pentyl acrylate, n-hexyl acrylate, 2-ethyl hexyl acrylate, and their ($C_1$–$C_{12}$) alkyl methacrylate analogs such as, e.g., methyl methacrylate, ethyl methacrylate, propyl methacrylate, iso-propyl methacrylate, butyl methacrylate, hexyl methacrylate, decyl methacrylate.

In a first preferred embodiment, the rubber is a polybutadiene homo polymer.

In an alternative preferred embodiment, the rubber is a copolymer, preferably a block copolymer, comprising structural units derived from one or more conjugated diene monomers and up to 50 percent by weight ("wt %") structural units derived from one or more monomers selected from vinyl aromatic monomers and monoethylenically unsaturated nitrile monomers, such as, for example, a styrene-butadiene copolymer, an acrylonitrile- butadiene copolymer or a styrene-butadiene-acrylonitrile copolymer.

In a highly preferred embodiment, the rubber is a styrene-butadiene block copolymer that contains from 50 to 95 wt % structural units derived from butadiene and from 5 to 50 wt % structural units derived from styrene.

The elastomeric phase is made by aqueous emulsion polymerization in the presence of a free radical initiator, a polyacid surfactant and, optionally, a chain transfer agent and coagulated to form particles of elastomeric phase material.

Suitable initiators include conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate.

Suitable chain transfer agents include, for example, a ($C_9$–$C_{13}$) alkyl mercaptan compound such as nonyl mercaptan, t-dodecyl mercaptan.

Suitable polyacid surfactants include soaps of a polycarboxylic acid that contains from 30 to 108 carbon, more preferably from 32 to 60 carbon atoms, per molecule.

The present invention is further described by way of the following examples. These examples are intended to be representative of the invention and are not in any way intended to limit its scope.

All US patents and US patent applications referenced herein either hereinbefore or hereinafter are herewith and hereby specifically incorporated reference.

Experimental

EXAMPLE 1

Preparation of Melt Polycarbonate Having Differing Levels of Fries

Numerous different catalyst were screened in a melt synthesis process to determine how they affected the Fries content of the polycarbonate product. The results are summarized below in Table 1.

TABLE 1

Various Catalysts for Melt Polymerization and Their Effect on Fries Product Formation.

| Sample Number | Catalyst | Concentration (x$10^4$) (moles/mole BPA) | Fries Product (ppm) |
|---|---|---|---|
| 1 | LiOH(2.5) | 0.81 | 2227 |
| 2 | NaOH(2.5) | 0.25 | 4332 |
| 3 | KOH(2.5) | 0.15 | 4902 |
| 4 | CsOH(2.5) | 0.042 | 4500 |
| 5 | TBPH(25) | 0.206 | 1000 |
| 6 | Ti(OBu)$_4$ | 0.17 | 750 |
| 7 | HEG(BPA)$_2$ | 0.90 | 530 |
| 8 | 1,3,4,6,7,8-hexhydro-1methyl-2H-pyrimdo[1,1-a]pyrimidine | 0.41 | 150 |

HEG(BPA)$_2$ is Hexaethyl guanidinium bis BPA salt, TBPH is tetrabutyl phosphonium hydroxide or BPA-salt.

The following is a description of exactly how the preparation was performed for sample number 5 in Table 1. The remaining samples were prepared by an otherwise identical procedure using the other catalysts listed in Table 1.

Synthesis of Sample 1

BPA (136.9 g; 0.600 mol) and DPC (138.9 g; 0.648 mol) were added into a one liter glass melt polymerization reactor as powders along with the tetrabutylphosphonium hydroxide (0.206×$10^{-4}$ mol); the glass reactor surfaces had been previously passivated via acid washing, rinsing, and subsequently drying at 70° C. overnight. The reactor vessel was deoxygenated by evacuation to about 1 torr and then refilling the vessel with purified nitrogen. This deoxygenation procedure was repeated a total of three times. The reactor vessel was immersed in a fluidized heat bath preheated to 180° C. The reaction mixture was allowed to melt, producing a colorless, homogenous liquid. Once a majority of the solid material melted, the remaining powder suspension was slowly stirred to promote better heat exchange. Upon forming a complete solution, the system was allowed to thermally equilibrate for 5–10 min. The solution was then stirred at 250 rpm. At this time, the reaction temperature was raised to 2100 C, and the pressure lowered to 175 mm Hg. Phenol began to distill from the reactor immediately (approx. 3–4 drops/sec). After 35 minutes, the reactor pressure was lowered to 100 mm Hg and held at this pressure for an additional 35 min. Phenol continued to distill into the receiver flask during this time (2 drops/sec) and a total volume of 68 mL was collected by the end of 210° C. stage. The reactor temperature was then raised to 240° C. (15 torr), and these conditions were maintained for 40 min. During this time period, phenol distilled at an average rate of about 1 drop/3–5 sec (a total of 105 mL were collected to this point). The reaction temperature was again raised up to 270° C. (2 torr) for 20 min, and was finally raised to 300° C. at 0.75 torr, and held for 65 min. The reaction was then terminated. A total of 122.1 grams of distillate was collected during the entire course of the reaction. The colorless, high molecular weight polycarbonate was collected yielding the following analytical data: Fries content 1000 ppm; $M_w$=53,447; $M_n$=18,256; $M_w/M_n$=2.928; $M_z$=103,907; and OH=0.120 wt %.

Measuring Fries Content

The content of Fries for each of the melt polycarbonates listed in Table 1 was determined as follows. First, 0.50 grams of polycarbonate was dissolved in 4.0 mL of THF (containing p-terphenyl as internal standard. Next, 3.0 mL of 18% KOH in methanol was added to this solution. The resulting mixture was stirred for two hours at room temperature. Next, we added 1.0 mL of acetic acid, and stirred the mixture for 5 minutes. Potassium acetate was allowed to crystallize over 1 hour. The solid was filtered off and the resulting filtrate was analyzed by liquid chromatograph using p-terphenyl as the internal standard.

EXAMPLE 2

Preparation of Melt Polycarbonate having Less Than 360 ppm Fries

The catalysts listed in Table 2 below were used to prepare polycarbonate by the melt synthesis method.

TABLE 2

Melt Polycarbonate Having Very Low Levels of Fries

| Sample No. | Catalyst | Catalyst Concentration | Mn 280° C. | Mn 310° C. | Fries 280° C. | Fries 310° C. |
|---|---|---|---|---|---|---|
| 1 | NaOH | $1.0 \times 10^{-6}$ M | 7419 | 9696 | 145 | 471 |
| 2 | Na$_x$H$_x$PO$_3$ | $1.0 \times 10^{-6}$ M | 6626 | 9380 | 47 | 163 |
| 3 | Na H PO$_4$ | $1.0 \times 10^{-6}$ M | 2240 | 7414 | <25 | 262 |
| 4 | K$_2$SO$_4$ | $1.0 \times 10^{-6}$ M | 1542 | 2645 | <25 | 283 |
| 5 | KH$_2$PO$_4$ | $1.0 \times 10^{-6}$ M | 1907 | 9277 | <25 | 277 |
| 6 | CsH$_2$PO$_4$ | $1.0 \times 10^{-6}$ M | 7983 | 10676 | 119 | 184 |
| 7 | Cs$_2$SO$_4$ | $1.0 \times 10^{-6}$ M | 8790 | 10127 | 238 | 248 |

The following is a description of how the experiment has performed for sample number 1 above. Samples 2–7 were produced by exactly the same procedure with the exception that the catalyst and its concentration differed as described in Table 1.

Synthesis of Sample 1

To facilitate observations, and to maintain purity, melt transesterification reactions were carried out in a 1 Liter glass batch reactor equipped with a solid nickel helical agitator. The reactor bottom had a breakaway glass nipple for removal of the final melt. To remove any sodium from the glass, the reactor was soaked in 3N HCl for at least 12 hours followed by a soak in 18 Mohm water for at least 12 hours. The reactor was then dried in an oven overnight and stored covered until use. The temperature of the reactor was maintained using a fluidized sand bath with a PID controller and measured near the reactor and sand bath interface. The pressure over the reactor was controlled by a nitrogen bleed into the vacuum pump downstream of the distillate collection flasks and measured at higher pressures (760 Mm Hg–40 Mm Hg) with a mercury barometer and at lower pressures (40 Mm Hg–1 Mm Hg) with an Edwards pirani gauge.

The reactor was charged with solid bisphenol-A (General Electric Plastics Japan Ltd., 0.6570 mol) and solid diphenyl carbonate (General Electric Plastics Japan Ltd., 0.7096 mol) prior to assembly. The reactor was then assembled, sealed and the atmosphere was exchanged with nitrogen three times. With the final nitrogen exchange, the reactor was brought to near atmospheric pressure and submerged into the fluidized bath, which was at 180° C. After five minutes, agitation was begun at 250 rpm. After an additional ten minutes, the reactants were fully melted and a homogeneous mixture was assumed. Tetramethyl ammonium hydroxide (Sachem, $1.32 \times 10^{-4}$ mol) and NaOH (J. T. Baker, $5.00 \times 10^{-7}$ mol) were added sequentially after being diluted to the proper concentrations (0.220 M TMAH and $1.00 \times 10^{-3}$ M NaOH) with deionized (18 Mohm) water. After the final catalyst was added, timing began and the temperature was ramped to 210° C. in five minutes. Once at temperature, the pressure was reduced to 180 mm Hg and phenol distillate was immediately formed. After 25 minutes, the pressure was again reduced to 100 mm Hg and maintained for 45 minutes. The temperature was then ramped to 240° C. in five minutes, and the pressure was lowered to 15 mm Hg. These conditions were maintained for 45 minutes. The temperature was then ramped to 270° C. in five minutes, and the pressure was lowered to 2 mm Hg. These conditions were maintained for 10 minutes. The temperature was then ramped to the final finishing temperature in five minutes, and the pressure was reduced to 1.1 mm Hg. Depending upon the experiment, the finishing temperature was either 280° C. or 310° C., as shown in Table 1. After 30 minutes, the reactor was removed from the sand bath and the melt was extruded into liquid nitrogen to quench the reaction.

In a series of experiments it has been found that melt processed polycarbonate (polycarbonate prepared by the melt process) show a benefit in flow improvement for polycarbonate rubber blends. Mixing of polycarbonate polymers prepared by the two different processes and thus having different levels of Fries branching produces intermediate levels of effects.

EXAMPLE 3

TABLE 3

Polycarbonate ABS Rubber Blends

| A | B | C | D | E | F | G | H |
|---|---|---|---|---|---|---|---|
| PC1 | | 100 | 22 | 50 | 19.7 | 0 | 31.2 |
| | PC3 | 100 | 22 | 48.6 | 20.5 | 900 | 34.4 |
| PC2 | | 100 | 6 | 66.4 | 24.5 | 0 | 12.9 |
| | PC4 | 100 | 6 | 64.1 | 26.5 | 1670 | 17 |
| PC1/PC2 | | 67/33 | 14.5 | 54.8 | 20.9 | 0 | 24.4 |
| | PC3/PC4 | 67/33 | 14.5 | 53.9 | 22.7 | 1150 | 27.4 |
| | PC5 | 100 | 14.5 | 53.7 | 22.8 | 860 | 27.8 |
| PC1/.PC2 | | 33/67 | 9.3 | 60.5 | 22.4 | 0 | 18.2 |
| | PC3/PC4 | 33/67 | 9.3 | 58.6 | 24.1 | 1420 | 21.2 |
| PC10 | | 100 | 12 | NM | NM | 0 | 29 |
| | PC11 | 100 | 11.6 | NM | NM | 1300 | 39 |

Notes:
1. Polycarbonate ABS rubber blends at a constant 65 weight percent polycarbonate with 35 weight percent ABS rubber (comprising 100 hundred parts by weight) with an additional 2.5 parts by weight per hundred parts polycarbonate and ABS rubber of stabilizers, release agents and pigments. NM stands for not measured
2. Column Headings:
   A. Interfacial Polycarbonate
   B. Melt Polycarbonate
   C. Polycarbonate Weight Percent Ratio
   D. PC MVR (at 300° C., 1.2 kg, cc/10 min.)
   E. $M_w$ (weight average molecular weight)
   F. $M_n$ (number average molecular weight)
   G. Fries Branching, ppm
   H. PC/ABS MVR (at 260° C., 5 kg, cc/10 min.)

The ABS rubber used in this example was a 22 parts per hundred parts by weight SAN (styrene acrylonitrile) copolymer itself composed of 75 parts per hundred parts by weight of styrene and 25 parts per hundred acrylonitrile and 13 parts per hundred parts by weight of an emulsion polymerized graft copolymer; yielding the 35 parts by weight per hundred parts by weight of the PC/ABS polymer blend (or alloy). The emulsion polymerized ABS graft copolymer had the following description: emulsion polymerized acrylonitrile butadiene styrene graft copolymer comprising 65 parts per hundred parts by weight (pph) of a discontinuous polybutadiene rubber phase and 35 parts per hundred parts by weight of a rigid styrene acrylonitrile thermoplastic phase, being a copolymer of 75 parts per hundred parts by weight styrene and 25 parts per hundred parts by weight acrylonitrile.

EXAMPLE 4

TABLE 4

Polycarbonate ABS Rubber Blends

| A | B | C | D | E | F | G | H |
|---|---|---|---|---|---|---|---|
| PC6 |  | 100 | 11 | NM | NM | NM | 11.7 |
|  | PC7 | 100 | 10.7 | NM | NM | NM | 14.3 |
| PC6 | PC7 | 50/50 | 11.1 | NM | NM | NM | 13.5 |
| PC8 |  | 100 | 13.5 | NM | NM | NM | 13.2 |
|  | PC9 | 100 | 13.3 | NM | NM | NM | 17.1 |
| PC8 | PC9 | 50/50 |  | NM | NM | NM | 15.7 |

Notes
1. Polycarbonate ABS rubber blends at a constant 74 weight percent polycarbonate with 26 weight percent ABS rubber (comprising 100 hundred parts by weight) with an additional 2.5 parts by weight per hundred parts polycarbonate and ABS rubber of stabilizers, release agents and pigments. NM stands for not measured
2. Column Headings:
   A. Interfacial Polycarbonate
   B. Melt Polycarbonate
   C. Polycarbonate Weight Percent Ratio
   D. PC MVR (at 300° C., 1.2 kg, cc/10 min.)
   E. $M_w$ (weight average molecular weight)
   F. $M_n$ (number average molecular weight)
   G. Fries Branching, ppm
   H. PC/ABS MVR (at 260° C., 5 kg, cc/10 min.)

The ABS rubber used in this example was a 14 parts per hundred parts by weight SAN (styrene acrylonitrile) copolymer itself composed of 75 parts per hundred parts by weight of styrene and 25 parts per hundred acrylonitrile and 12 parts per hundred parts by weight of an emulsion polymerized graft copolymer; yielding the 26 parts by weight per hundred parts by weight of the PC/ABS polymer blend (or alloy). The emulsion polymerized ABS graft copolymer had the following description: emulsion polymerized acrylonitrile butadtiene styrene graft copolymer comprising 50 parts per hundred parts by weight (pph) of a discontinuous polybutadiene rubber phase and 50 parts per hundred parts by weight of a rigid styrene acrylonitrile thermoplastic phase, being a copolymer of 75 parts per hundred parts by weight styrene and 25 parts per hundred parts by weight acrylonitrile.

EXAMPLE 5

TABLE 5

Polycarbonate ABS Rubber Blends Containing Flame Retardant

| A | B | C | D | E | F | G | H |
|---|---|---|---|---|---|---|---|
| PC1 |  | 100 | 22 | 50 | 19.7 | 0 | 24 |
|  | PC3 | 100 | 22 | 48.6 | 20.5 | 900 | 30.7 |
| PC2 |  | 100 | 6 | 66.4 | 24.5 | 0 | 7.8 |
|  | PC4 | 100 | 6 | 64.1 | 26.5 | 1670 | 10.2 |

TABLE 5-continued

Polycarbonate ABS Rubber Blends Containing Flame Retardant

| A | B | C | D | E | F | G | H |
|---|---|---|---|---|---|---|---|
| PC1/PC2 |  | 67/33 | 14.5 | 54.8 | 20.9 | 0 | 15.9 |
|  | PC3/PC4 | 67/33 | 14.5 | 53.9 | 22.7 | 1150 | 20.7 |
| PC1/PC2 |  | 33/67 | 9.3 | 60.5 | 22.4 | 0 | 10.9 |
|  | PC3/PC4 | 33/67 | 9.3 | 58.6 | 24.1 | 1420 | 12.9 |

Notes:
1. Polycarbonate ABS rubber blends at a constant 70 weight percent polycarbonate with 20 weight percent ABS rubber (comprising 100 hundred parts by weight) with 10 weight percent of resorcinol diphosphate as a flame retardant as taught in U.S. Pat. No. 5,204,394 with an additional 2.5 parts by weight per hundred parts polycarbonate and ABS rubber of stabilizers, release agents and pigments.
2. Column Headings:
   A. Interfacial Polycarbonate
   B. Melt Polycarbonate
   C. Polycarbonate Weight Percent Ratio
   D. PC MVR (at 300° C., 1.2 kg, cc/10 min.)
   E. $M_w$ (weight average molecular weight)
   F. $M_n$ (number average molecular weight)
   G. Fries Branching, ppm
   H. PC/ABS MVR (at 260° C., 2.16 kg, cc/10 min.)

The ABS rubber used in this example was a 10 parts per hundred parts by weight SAN (styrene acrylonitrile) copolymer itself composed of 75 parts per hundred parts by weight of styrene and 25 parts per hundred acrylonitrile and 10 parts per hundred parts by weight of an emulsion polymerized graft copolymer; yielding the 35 parts by weight per hundred parts by weight of the PC/ABS polymer blend (or alloy). The emulsion polymerized ABS graft copolymer had the following description: emulsion polymerized acrylonitrile butadiene styrene graft copolymer comprising 50 parts per hundred parts by weight (pph) of a discontinuous polybutadiene rubber phase and 50 parts per hundred parts by weight of a rigid styrene acrylonitrile thermoplastic phase, being a copolymer of 75 parts per hundred parts by weight styrene and 25 parts per hundred parts by weight acrylonitrile.

Although the present invention has been described in considerable detail with reference to certain preferred versions thereof, other versions are also meant to be included in the appended claims. Therefore, the spirit and scope of the appended claims should not be limited to the description of the preferred versions contained herein.

Having described the invention, that which is claimed is:
1. A composition comprising polycarbonate and rubber wherein said polycarbonate has a Fries content ranging from 400 to 4,000 ppm and wherein said polycarbonate comprises a blend of a polycarbonate produced by a melt process and a polycarbonate produced by an interfacial process.
2. A composition according to claim 1 wherein the Fries content of the polycarbonate ranges from 500 to 3,000 ppm.
3. A composition according to claim 2 wherein the Fries content of the polycarbonate ranges from 1,000 to 3,000 ppm.

* * * * *